United States Patent [19]

Pellolio, Jr.

[11] 4,305,181
[45] Dec. 15, 1981

[54] LIFTING HOOK WITH CAM LOCK GATE

[75] Inventor: Anselmo P. Pellolio, Jr., Cotati, Calif.

[73] Assignee: E. D. Bullard Company, Sausalito, Calif.

[21] Appl. No.: 139,097

[22] Filed: Apr. 10, 1980

[51] Int. Cl.³ .................. A44B 13/02; B66C 1/34
[52] U.S. Cl. .................. 24/241 PL; 24/241 PS; 24/241 SB; 294/82 R; 294/83 AB
[58] Field of Search ....... 24/241 PL, 241 PS, 241 SB; 294/82 R, 83 R, 83 AB

[56] References Cited

U.S. PATENT DOCUMENTS

| | | | |
|---|---|---|---|
| 2,196,460 | 4/1940 | Hertel | 294/82 R |
| 2,791,817 | 5/1957 | Burnham | 24/241 PL |
| 3,003,214 | 10/1961 | Geraghty | 24/241 PL |
| 3,121,274 | 2/1964 | Evans | 24/241 PL |
| 3,121,276 | 2/1964 | Evans | 24/241 PL |
| 3,187,395 | 6/1965 | Gaylord | 294/83 R |
| 3,430,307 | 3/1969 | Burnham | 24/241 PL |
| 3,480,319 | 11/1969 | Raschke | 294/82 R |
| 3,568,269 | 3/1971 | Moretti | 24/241 PL |
| 3,611,515 | 10/1971 | Raschke | 24/241 PL |
| 3,674,301 | 7/1972 | Crook, Jr. | 294/82 R |

Primary Examiner—Victor N. Sakran
Attorney, Agent, or Firm—Phillips, Moore, Weissenberger, Lempio & Majestic

[57] ABSTRACT

A lifting hook with a safety gate journaled about the shank thereof, which safety gate is locked against rotation about the shank by a cam member mounted for pivotal movement on the safety gate and spring loaded to abut a flat formed on the shaft when the safety gate is in its closed position. The cam member is adapted to be manually pivoted out of abutment with the flat on the shaft to enable the safety gate to be opened and a preferred embodiment is described in detail in which the cam member is pivoted in the opposite direction to release the safety gate from the direction in which the safety gate is rotated to open the hook, the cam member being protected by the structure of the safety gate from accidental pivoting to release the safety gate.

8 Claims, 6 Drawing Figures

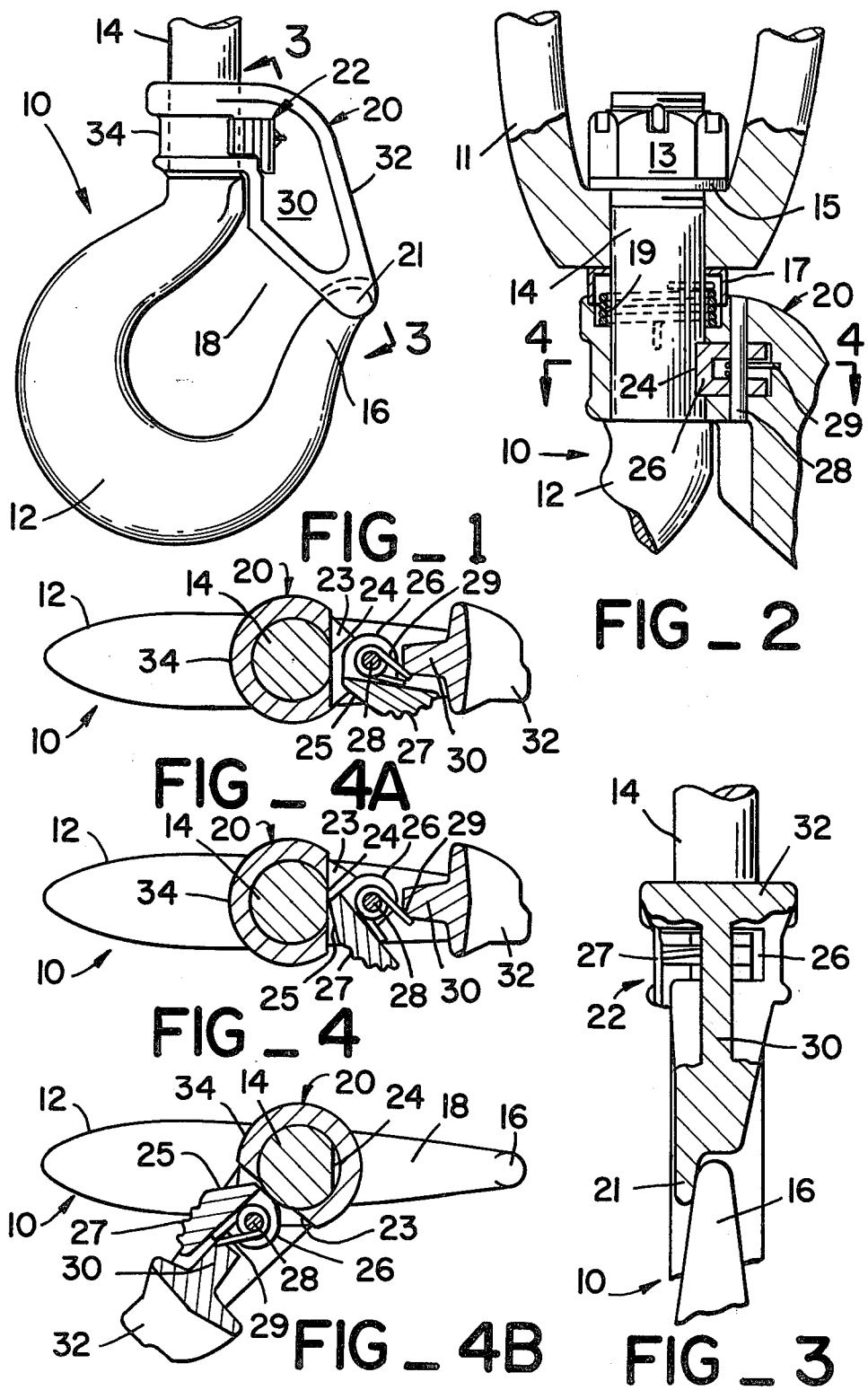

LIFTING HOOK WITH CAM LOCK GATE

DESCRIPTION

1. Technical Field

This invention relates generally to a lifting hook for use in hoisting cargo and the like having a safety gate for preventing accidental release of the load from the hook or snagging of the hook and more particularly to an improved releasable locking means for maintaining the safety gate in closed position until release is desired.

2. Background of the Invention

Hoisting or lifting hooks having safety gates with various locking means have been proposed in the prior art. Such locking means must reliably secure the safety gate in closed position and yet be capable of being easily released when desired.

The locking means must be designed to be manually released even by a person wearing heavy gloves. Furthermore, it has been proposed that the locking means be adapted for release from a remote point by means of a jerk line. Thus, although otherwise satisfactory, there is the danger that locking devices of the prior art could be accidentally released if the hook becomes snagged in operation resulting in imposition of forces on the release mechanism of the locking means.

The locking means according to this invention has the advantage that any forces which might be accidentally imposed thereon in such a way as to result in unlocking of the gate will tend to maintain the gate in its closed position. In addition, the locking means according to this invention has the advantage that forces imposed on the gate in such a way as to tend to cause it to open the throat of the hook will only result in an increase of the locking forces. At the same time, the locking means is simple and inexpensive to manufacture and easy to release even with heavily gloved hands.

SUMMARY OF THE INVENTION

In one aspect of this invention, an improved locking means is provided in a lifting hook with a cylindrical shank having a body with an open throat and a gate journaled for rotation in a given direction about the cylindrical axis of the shank to close the throat of the hook. The improved locking means comprises a flat formed on the shank and a cam member pivotally mounted on the gate for reciprocal rotation in directions which are substantially transverse to the cylindrical axis of the shank. The cam member has a first cam surface adapted to be pivoted into compressive abutment with the flat formed on the shaft by rotation of the cam member in a direction substantially opposite the given direction of rotation of the gate to close the throat of the hook and a second cam surface adapted to be manually contacted to pivot the first cam surface out of abutment with the flat formed on the shank.

The accidental release and opening of the gate is avoided since, according to this invention, forces accidentally imposed on the second cam surface tending to pivot the first cam surface out of contact with the flat will also tend to hold the gate in its closed position. However, manually gripping the gate between the thumb and finger even of a heavily gloved hand will naturally and easily apply force to the second cam surface of the cam member with respect to the gate to cause the cam member to rotate, thereby allowing the gate to be simultaneously rotated by hand in a convenient and natural movement.

BRIEF DESCRIPTION OF THE DRAWING

This invention will be more fully understood from a reading of the following detailed description of a preferred embodiment thereof in conjunction with the appended drawing wherein:

FIG. 1 is a side view in elevation of a lifting hook and safety gate with the improved locking means according to a preferred embodiment of this invention.

FIG. 2 is an enlarged fragmentary view showing a lifting bail partially in cross-section as mounted on the shank of the lifting hook of FIG. 1 with structural details of the safety gate which is journaled on such shank together with structural details of the improved locking means according to a preferred embodiment of this invention shown in cross-section.

FIG. 3 is an enlarged cross-sectional view taken along line 3—3 of FIG. 1.

FIG. 4 is a cross-sectional view taken along line 4—4 of FIG. 2 with the improved locking means according to this embodiment of the invention shown in its locking position.

FIG. 4A is a cross-sectional view identical to FIG. 4, but showing the improved locking means according to this embodiment of the invention in its unlocked position.

FIG. 4B is a cross-sectional view identical to FIGS. 4 and 4A but showing the improved locking means according to this embodiment of the invention in its unlocked position with the gate rotated to open the throat of the lifting hook.

DETAILED DESCRIPTION OF PREFERRED EMBODIMENT

Referring to FIG. 1, a lifting hook 10 comprising a hook body 12 connected to a cylindrical shank 14 and having a tip 16 spaced from the shank 14 to define an open throat 18 as known in the prior art is shown. A safety gate 20 embodying a locking means 22 according to the teaching of this invention is shown journaled on the shaft 14 and spanning the open throat 18 of the lifting hook 10.

Referring to FIG. 2, an enlarged view of the shank 14 of the lifting hook 10 is shown. As is conventional in the art, the free end of the shank 14 is threaded and a lifting bail 11 is mounted thereon by means of a nut 13 locked against rotation with the bail 11 by a cotter pin (not shown). A washer 15 between the nut 13 and bail 11 facilitate rotation of bail 11 with respect to the nut 13.

An apertured cup 17 surrounding the shank 14 is interposed between the bail 11 and the safety gate 20. The apertured cup 17 cooperates with a recess formed in the safety gate 20 about the shank 14 to house a torsion spring 19. One end of the torsion spring 19 extends radially into a hole in the shaft 14 and the other end of the torsion spring 19 extends parallel to the axis thereof into a hole in the safety gate 20.

As best shown in FIGS. 1 and 3 the free end 21 of the safety gate 20 is provided with a recess adapted to be brought into compressive abutment with the tip 16 of the hook 10. Safety gate 20 is spring biased by the torsion spring 19 to rotate about the shank 14 with the free end 21 thereof being urged by the spring 19 into compressive abutment with the tip 16 of the hook 10 thus normally closing the throat 18 of the hook 10.

The locking means 22 according to the teaching of this invention is adapted to lock the safety gate 20 in its position closing the throat 18 of the hook 10. Such locking means 22 comprises a flat 24 formed in the side of the portion of the shank 14 about which the safety gate 20 is journaled and cam member 26 mounted on the safety gate 20 for pivotal movement about an axle pin 28.

As best shown in FIG. 4 the portion of the safety gate 20 surrounding the shank 14 is provided with an opening 23 through which the cam member 26 may project into contact with the shank 14. The cam member 26 is provided with a first cam surface 25 which abuts the shank 14 and a second cam surface 27 adapted to be manually contacted to pivot the cam member 26 about the axle 28. A torsion spring 29 is mounted about the axle 28 with one end engaging the safety gate 20 and the other end engaging the cam member 26. The torsion spring 29 is adapted to spring bias the cam member 26 to rotate about the axle 28 urging the first camming surface 25 thereof into compressive engagement with the shank 14 through the opening 23. Thus the second cam surface 27 of the cam member 26 is manually contacted to pivot the cam member 26 against the force of the spring 29 to rotate the cam member 26 about the axle 28 so that the first cam surface 25 is moved out of abutment with the shank 14.

According to this invention the cam member 26 is urged to rotate in the opposite direction about the axis 28 by the spring bias of the torsion spring 29 from the direction in which the safety gate 20 is urged to rotate about the shank 14 by the spring bias of the torsion spring 19. Thus as shown in FIGS. 4, 4A and 4B the safety gate 20 is rotated in a clockwise direction to open the throat 18 and is spring biased to rotate in a counterclockwise direction about the shaft 14 to close the throat 18. On the other hand, the cam member 26 is manually rotated in a counterclockwise direction to remove the cam surface 25 from abutment with the flat 24 on the shaft 14 and is spring biased to rotate in a clockwise direction about the axle 28 in order to bring the cam surface 25 into compressive abutment with the shaft 14.

Referring specifically to FIG. 4, the safety gate 20 is shown in position to close the throat 18 and the cam member 26 is shown with the first cam surface 25 thereof in compressive contact with the flat 24 on the shaft 14 to lock the safety gate 20 in its closed position. Any forces acting on the safety gate 20 which tend to cause it to rotate in a clockwise direction about the shaft 14 will also tend to cause the cam member 26 to rotate in a clockwise direction thereby wedging the cam surface 25 against the flat 24 on the shank 14 with increased force making it impossible for the safety gate 20 to rotate in a clockwise direction. On the other hand, a force acting on the second cam surface 27 of the cam member 26 tending to rotate it in a counterclockwise direction against the force of the spring 29 will also tend to rotate the safety gate 20 in a counterclockwise direction about the shaft 14 forcing the free end 21 of the safety gate 20 more firmly against the tip 16 of the hook 10 thus insuring that the throat 19 of the hook 10 will remain closed.

However, if the safety gate 20 is grasped between the thumb and fingers of a person's right hand, the thumb can easily contact the second cam surface 27 of the cam member 26 to rotate it in a counterclockwise direction about the axis 28 due to compressive forces between the thumb and fingers. At the same time the safety gate 20 may be easily rotated in a clockwise direction about the shaft 14 by a natural movement of the person's wrist or arm. Once the safety gate 20 has been rotated in a clockwise direction, a few degrees, the compressive force between the thumb and fingers on the second cam surface 27 may be released allowing the cam member 26 to be urged into contact with the cylindrical side surface of the shank 14. The cam member 26 will ride freely on the clyindrical side wall of the shank 14 and upon release of the safety gate 20, the torsion spring 19 will cause the safety gate 20 to rotate in a counterclockwise direction about the shaft 14 until the free end 21 thereof is again in contact with the tip 16 of the hook 10. At this point the torsion spring 29 will urge the cam member 26 to rotate in a clockwise direction to bring the first cam surface 25 thereof into contact with the flat 24 again locking the safety gate 20 against rotation away from the tip 16 of the hook 10.

In the preferred embodiment of this invention shown in the drawing, the flat 24 is formed on the shank 14 directly opposite the tip 16 of the hook 10. Also, according to the preferred embodiment of this invention shown in the drawing, the safety gate 20 comprises a web 30 extending in the plane of the hook 10 with a transverse flange along the outside thereof. The web and flange are formed integrally with a hub 34 which surrounds the shank 14. The opening 23 is formed in the web and hub 34 and axle 28 is mounted in the opening in the web 30. The cam member 26 is dimensioned so that it will be substantially housed by the flange 32 thereby protecting the second cam surface 27 of the cam member 26 from being accidentally contacted in such a way as to tend to rotate the cam member 26 in a counterclockwise direction against the force of the spring 29. On the other hand, the cam member 26 is so located with respect to the flange 32 that it may be easily contacted by the thumb of even a heavily gloved hand with the flange 32 providing a convenient grip for heavily gloved fingers to facilitate rotation of the safety gate 20 to open the throat 18 of the hook 10.

It should be noted that rotation of the safety gate 20 in a clockwise direction about the shank 14 as shown in the drawing will be limited by contact with the body 12 of the hook 10. Thus, the safety gate 20 is limited to reciprocal rotation through an arc of about 150° on one side of the plane of the hook 10 to open and close the throat 18. Similarly, counterclockwise rotation of the cam member 26 is limited by contact with the web 30. Thus, the cam member is limited to reciprocal rotation through an arc of about 90° on the same side of the plane of the hook 10.

Obvious modifications may be made in the preferred embodiment of this invention as shown in the drawing without departing from the scope of the following claims. For example, the flat 24 on the shank 14 need not be directly opposite the tip 16 of the hook 10 provided that the cam member 26 is pivoted on the hub 34 of the safety gate 20 at the proper location to cooperate with the flat in locking the safety gate 20 in its closed position. Obviously, mirror image embodiments of this invention may be made in which the safety gate and cam member rotate in the opposite directions from the directions shown in the enclosed drawing to close and lock the safety gate.

The first cam surface 25 is preferably planar as shown in the drawing. However, such first cam surface may also have any other surface configuration which increases in radius with respect to the axle pin 28 from a radius which is less than the distance between such axle and the flat 24 on the shank 14 when the gate 20 is closed to a radius which is greater than such distance. According to the invention, such increase in radius must take place in the direction in which the cam member 26 is rotated to move the first cam surface 25 out of abutment with the flat 14. Thus, the cam surface may have any convexly curved or other suitable configuration within the scope of the following claims.

What is claimed is:

1. In a lifting hook having a cylindrical shank, a hook body connected to said shank and having an open throat, a gate journaled for rotation about the cylindrical axis of said shank in a given direction to close said throat, stop means for establishing the limit of said rotation of said gate in said given direction at the point where said gate closes said throat and releasable locking means for locking said gate in position to close said throat; the improvement wherein said locking means comprises a flat formed on said shank and a cam member pivotally mounted on said gate member for reciprocal rotation in directions which are substantially transverse to said cylindrical axis of said shank, said cam member having a first cam surface adapted to be pivoted into compressive abutment with said flat formed on said shank by rotation of said cam member in a direction substantially opposite said given direction of rotation of said gate when said gate is in position to close said throat as established by said stop means and a second cam surface adapted to be manually contacted to pivot said first cam surface out of abutment with said flat formed on said shank by reciprocal rotation of said cam member, said gate being spring biased to rotate in said given direction about the cylindrical axis of said shaft and said cam member being spring biased to rotate in said direction substantially opposite said given direction of rotation of said gate.

2. The improvement in a lifting hook as claimed in claim 1 wherein said first cam surface increases in radius with respect to the axis of rotation thereof from a radius which is less than the distance between said axis of rotation thereof and said flat on said shank when said gate is in position to close said throat to a radius which is greater than said distance, said first cam surface increasing in radius in the direction with respect to said axis of rotation thereof which is substantially opposite said given direction of rotation of said gate to close said throat.

3. The improvement in a lifting hook as claimed in claim 2 wherein said first cam surface is substantially planar.

4. The improvement in a lifting hook as claimed in claim 3 wherein said second cam surface is substantially planar and extends at an included angle of more than ninety degrees with respect to said first cam surface.

5. The improvement in a lifting hook as claimed in claim 1 wherein said safety gate comprises a hub journaled for rotation about said cylindrical axis of said shank, a web formed integrally with said hub, said web having an integral flange at its outer edge, and wherein a common opening is formed in said web and said hub, said cam member being pivotally mounted in said opening with said first cam surface thereof adapted to project through said hub into compressive abutment with said shank, said flat being formed on said shank opposite said open throat of said hook body.

6. In a lifting hook having a cylindrical shank, a hook body connected to said shank defining opposite sides and having an open throat, a gate journaled for reciprocal rotation about the cylindrical axis of said shank through an arc on one side of said body in one direction to open said throat and in the opposite direction to close said throat, stop means for establishing the limit of said rotation of said gate in said opposite direction at a point where said gate closes said throat and locking means for releasably locking said gate against rotation substantially at said point; the improvement wherein said locking means comprises a flat formed on said shank and a cam member pivotally mounted on said gate for reciprocal rotation about an axis substantially parallel to said cylindrical axis of said shank, said cam member having a first cam surface increasing in radius with respect to the axis of rotation thereof from a radius which is less than the distance between said axis of rotation thereof and said flat on said shank when said gate is in engagement with said stop means to a radius which is greater than the distance between said axis of rotation thereof and said flat on said shank when said gate is in engagement with said stop means, said first cam surface increasing in radius in the direction with respect to said axis of rotation thereof which is opposite to said one direction of rotation of said gate with respect to said cylindrical axis of said shank, said cam member having a second cam surface adapted to be manually contacted to rotate said cam member about said axis of rotation thereof in said direction with respect to said axis of rotation thereof which is opposite to said one direction of rotation of said gate with respect to said cylindrical axis of said shank, said cam member being spring biased to rotate said first cam surface thereof into compressive abutment with said shank.

7. The improvement in a lifting hook as claimed in claim 6 wherein said gate is spring biased to rotate in said opposite direction to close said throat.

8. The improvement in a lifting hook as claimed in claim 6 wherein said first cam surface of said cam member is substantially planar.

* * * * *